US007441439B2

(12) United States Patent
Mc Farland et al.

(10) Patent No.: US 7,441,439 B2
(45) Date of Patent: Oct. 28, 2008

(54) PORTABLE PRESSURE SWITCH CALIBRATION AND DIAGNOSTIC TOOL

(76) Inventors: Richard Dean Mc Farland, 11955 Algiers Dr., Cincinnati, OH (US) 45246; Gene Edward Warren, 8311 Newbury St., Cincinnati, OH (US) 45216

( * ) Notice: Subject to any disclaimer, the term of this patent is extended or adjusted under 35 U.S.C. 154(b) by 0 days.

(21) Appl. No.: 11/627,530

(22) Filed: Jan. 26, 2007

(65) Prior Publication Data

US 2007/0119225 A1 May 31, 2007

(51) Int. Cl.
*G01L 27/00* (2006.01)

(52) U.S. Cl. .......................................................... 73/1.71

(58) Field of Classification Search ....................... None
See application file for complete search history.

(56) References Cited

U.S. PATENT DOCUMENTS

| | | | | |
|---|---|---|---|---|
| 821,988 | A | 5/1906 | Craig, Jr. | |
| 3,720,090 | A | 3/1973 | Halpert et al. | |
| 3,831,391 | A | 8/1974 | Blomstrand | |
| 4,030,365 | A | 6/1977 | Phillips et al. | |
| RE30,207 | E | 2/1980 | Kolze et al. | |
| 4,262,178 | A | 4/1981 | Berlin, Jr. | |
| 4,375,162 | A | 3/1983 | Eppley | |
| 4,527,217 | A | 7/1985 | Muller-Girard et al. | |
| 4,591,093 | A | 5/1986 | Elliott, Jr. | |
| 4,621,984 | A | 11/1986 | Fussell | |
| 4,658,829 | A | 4/1987 | Wallace | |
| 4,815,313 | A | 3/1989 | Beard | |
| 5,092,158 | A | 3/1992 | Tuma et al. | |
| 5,324,181 | A | 6/1994 | McGoldrick et al. | |
| 5,363,689 | A | 11/1994 | Hoffmann et al. | |
| 5,495,079 | A | 2/1996 | Joyce | |
| 6,170,316 | B1 | 1/2001 | Aldrich | |
| 6,663,352 | B2 * | 12/2003 | Sabini et al. | 417/63 |
| 2002/0134439 | A1 * | 9/2002 | Kawasaki et al. | 137/565.23 |
| 2005/0160784 | A1 * | 7/2005 | Tang | 73/1.27 |

* cited by examiner

*Primary Examiner*—Robert R Raevis
(74) *Attorney, Agent, or Firm*—Ronald J. Richter; Hasse & Nesbitt LLC

(57) ABSTRACT

An apparatus for calibration and testing of pressure switches which are typically used in residential and commercial HVAC systems. The apparatus can be used to test, set or adjust a pressure switch to the manufacturer's specifications. The apparatus includes an exterior housing with an on/off switch, two vacuum nozzles, and a bypass control valve mounted thereon, with the inside of the housing including an air compressor in communication with the nozzles and the bypass control valve. The air compressor typically operates from a battery power supply located within the housing. A pressure measuring device, such as a differential pressure gage, and a conductivity indicator are typically used in conjunction with the device to calibrate adjustable pressure switches and to test and diagnose faulty pressure switches. The apparatus can be constructed as a compact, hand-held instrument for use in an HVAC service environment, and can include the pressure measuring device and/or the conductivity indicator within its housing.

19 Claims, 12 Drawing Sheets

PORTABLE PRESSURE SWITCH CALIBRATION AND DIAGNOSTIC TOOL

CROSS-REFERENCE TO RELATED APPLICATIONS

This application claims the benefit of U.S. Provisional Application No. 60/650,721, filed Feb. 7, 2005, and U.S. Non-Provisional Application Ser. No. 11/348,842, filed Feb. 7, 2006.

FIELD OF THE INVENTION

The present invention relates generally to testing and calibration of pressure switches, and more particularly, to a portable, hand-held tool for calibrating and diagnosing problems with pressure switches associated with HVAC systems.

BACKGROUND OF THE INVENTION

A pressure switch is a mechanical device which converts a pressure change of a liquid or gas into an electrical function. The pressure change might be measured as pressure, vacuum, or differential between two pressure inputs. In every case, the pressure switch will employ a diaphragm, a piston, or other pressure-responsive sensor which is coupled to the mechanical means of actuating a switch. Pressure switches fulfill a variety of monitoring and control applications, and they are employed in virtually every industry, from appliances to automobiles to computers. They are often used in pneumatic systems, such as air compressor pressure switches for furnaces or HVAC systems, as well as water pressure switches or oil pressure switches. Pressure switches are common components of high-efficiency heating systems as well as high-efficiency water heaters. Different manufactures make differing types of pressure switches, and each type is set according to the manufacturer's specifications.

Pressure switches activate electromechanical or solid-state switches upon reaching a specific pressure level. For example, normally-open pressure switches are used to keep the system from operating should the pressure not be high enough or exceed the safety limit. For example, should a flue become partially plugged, the pressure in the exhaust will build up presenting a dangerous condition. Flue gases containing carbon monoxide will spill into the living space. The flames will become unstable and "float" or "spill" out of the heat exchanger creating a fire hazard. Under these conditions, the normally-open switch will not close and the furnace will not be able to run. As this example illustrates, if the pressure in a system becomes either too high or too low, depending on whether the switch is a positive pressure switch that measures positive pressures, or a negative pressure switch that measures negative (vacuum) pressures, the pressure-responsive sensor (e.g. a diaphragm within the switch) will be affected to the point where the pressure switch will not complete the circuit, such that the power to the system controls is lost and the system not run. Normally closed switches can also be used to verify that it is safe for the furnace to come on. If the switch had failed and it was stuck open, then the furnace would not come on.

Dual, or differential, pressure switches have a normally closed and a normally open circuit. The normally closed circuit allows the furnace to safely initiate the sequence of operation resulting in a flame. Typically negative pressure is created by the expelling of the flue gases, and the normally open circuit will close. This allows the furnace to continue operating safely because the flue gases are being expelled.

Most differential pressure switches have two hoses connected. The first hose is located at the vacuum side of the switch and is connected to the flue circuit (the flue circuit expels the burned gases). The second hose is located at the positive pressure side of the switch and is connected to the gas valve (the gas circuit mixes air with the gas creating the flame). Generally, there should be little or no positive pressure. Should a positive pressure exist, it is typically an indication that the primary or secondary heat exchanger is becoming plugged. As a result, pressure build up creates a positive pressure which will negate from the negative or vacuum pressure, thus causing the negative (vacuum) pressure to drop below the setting and shut the furnace down.

Faulty pressure switches have been one of the most misdiagnosed problems in today's modern furnaces. Many pressure switches have been replaced needlessly, simply because there was no proper way to test them. It is typically the technician's best guess as to whether a problem exists which necessitates replacement of the pressure switch. Thus, many service calls could have been resolved easily if the pressure switch was first able to be tested properly before being replaced. While one can test to see if there is enough pressure to close the switch simply by attaching a pressure measuring device such as a manometer in the line, but this will not tell you if the switch is working properly.

A significant need exists in the HVAC field for the diagnosis and calibration of pressure switches. Pressure switches are "safety devices" in today's modern heating systems. These safety devices shut the heating system down should there be a problem with getting rid of the flue gas which contains carbon monoxide. They also insure that the system is getting enough air for the correct and safe combustion of the fuel gas mixture. Since pressure switches are safety devices used on all high-efficiency heating systems used for heating residential, commercial and industrial buildings, it is extremely important that any malfunction of the pressure switch is properly diagnosed, and, if it is an adjustable pressure switch, that it is set correctly. There is currently no known tool available to the service technician that can be used to create pressure or vacuum in order to test, set or adjust a pressure switch to the manufacturer's specifications while in the field.

Prior art calibration devices also do not allow one to accurately diagnose pressure switch failure, or impending failure. Often the service technician must simply guess if a pressure switch has failed, or else guess the remaining life expectancy of a pressure switch by exchanging the pressure switch to see if the replacement switch corrected the problem. Prior to the present invention, it was also not previously possible to accurately diagnose early failure or possible failure of a pressure switch that was starting to go bad. Even worse, technicians have wasted valuable time being called back to a worksite after replacing a pressure switch, only to find out that the problem was the flue, or a blocked intake or condensate system.

Therefore, there exists a need for an HVAC service technician to be able to quickly, easily and accurately set and/or calibrate adjustable pressure switches in an HVAC system. Likewise, there is a need to provide a portable apparatus to allow the technician to perform diagnostic tests on furnace pressure switches at the worksite. It would also be advantageous to provide a hand-held calibration and diagnostic tool that can be used on pressure switches that are either part of a working HVAC system or not yet assembled into such a system. These and other features and advantages of the present invention will become more apparent with reference to the accompanying specification and claims.

SUMMARY OF THE INVENTION

In general, the present invention discloses an apparatus for calibration and testing of a pressure switch typically used in residential and commercial HVAC systems.

A first aspect of the invention provides an apparatus for calibrating and testing a pressure switch, the apparatus comprising: (a) a housing including an inside and an external surface; (b) an air compressor having a vacuum-side inlet and a pressure-side outlet; (c) a vacuum nozzle in fluid communication with the vacuum-side inlet of the air compressor; (d) a pressure nozzle in fluid communication with the pressure-side outlet of the air compressor; (e) a recirculation circuit in fluid communication with the vacuum-side inlet, the pressure-side outlet, the vacuum nozzle and the pressure nozzle and adapted to conduct air flow between the vacuum nozzles and the pressure nozzle; and (f) a bypass control valve within the recirculation circuit for controlling the amount of air passing between the vacuum nozzle and the pressure nozzle.

A second aspect of the invention is an apparatus for the calibration and testing of a pressure switch, the apparatus comprising: (a) a housing including an inside and an external surface; (b) an air compressor having a vacuum-side inlet and a pressure-side outlet; (c) a vacuum nozzle in fluid communication with the vacuum-side inlet of the air compressor; (d) a pressure nozzle in fluid communication with the pressure-side outlet of the air compressor; (e) a recirculation circuit in fluid communication with the vacuum-side inlet, the pressure-side outlet, the vacuum nozzle and the pressure nozzle and adapted to conduct air flow between the vacuum nozzles and the pressure nozzle; (f) a bypass control valve within the recirculation circuit for controlling the amount of air passing between the vacuum nozzle and the pressure nozzle; (g) an air pressure measuring device operable to measure air within the recirculation circuit; and (h) a conductivity indicator including at least two lead inputs and an indicator light, the conductivity indicator operable to visually indicate whether the pressure switch is open or closed.

A third aspect of the invention provides an apparatus comprising: (a) an air compressor having a vacuum-side inlet and a pressure-side outlet; (b) a vacuum nozzle in fluid communication with the vacuum-side inlet of the air compressor; (c) a pressure nozzle in fluid communication with the pressure-side outlet of the air compressor; (d) a recirculation circuit in fluid communication with the vacuum-side inlet, the pressure-side outlet, the vacuum nozzle and the pressure nozzle and adapted to conduct air flow between the vacuum nozzles and the pressure nozzle; and (e) a bypass control valve within the recirculation circuit for controlling the amount of air passing between the vacuum nozzle and the pressure nozzle, whereby the apparatus is adapted for calibrating and testing a pressure switch.

A fourth aspect of the invention provides an apparatus for calibrating and testing a pressure switch, the apparatus comprising: (a) a housing including an inside and an external surface; (b) an air compressor including a vacuum-side inlet and a pressure-side outlet; (c) a first vacuum nozzle in fluid communication with the vacuum-side inlet of the air compressor; (d) a second vacuum nozzle in fluid communication with the vacuum-side inlet of the air compressor; (e) an internal positive pressure opening in fluid communication with the pressure-side outlet of the air compressor; (f) a recirculation circuit in fluid communication with the vacuum-side inlet, the pressure-side outlet, the first and second vacuum nozzles and the internal positive pressure opening; (g) a bypass control valve within the recirculation circuit for controlling the amount of air passing from the pressure-side outlet to the vacuum-side inlet of the air compressor; (h) a conductivity indicator comprising two lead inputs and an indicator light, the conductivity indicator operable to visually indicate whether the pressure switch is open or closed; (i) a battery in electrical communication with the air compressor and the conductivity indicator, the battery adapted to supply power to the air compressor; and (j) an electrical switch configured as an on/off button adapted to permit electrical communication between the battery and the air compressor.

A fifth aspect of the invention provides an apparatus for the calibration and testing of a pressure switch, the apparatus comprising: (a) a housing including an inside and an external surface; (b) an air compressor having a vacuum-side inlet and a pressure-side outlet, (c) a first vacuum nozzle in fluid communication with the vacuum-side inlet of the air compressor; (d) a second vacuum nozzle in fluid communication with the vacuum-side inlet of the air compressor; (e) an internal positive pressure opening in fluid communication with the pressure-side outlet of the air compressor; (f) a recirculation circuit in fluid communication with the vacuum-side inlet, the pressure-side outlet, the first and second vacuum nozzles and the internal positive pressure opening; (g) a bypass control valve within the recirculation circuit for controlling the amount of air passing from the pressure-side outlet to the vacuum-side inlet of the air compressor; and (h) a conductivity indicator including at least two lead inputs and an indicator light, the conductivity indicator operable to visually indicate whether the pressure switch is open or closed.

A sixth aspect of the invention provides an apparatus for calibrating and testing a pressure switch, the apparatus comprising: (a) a housing including an inside and an external surface; (b) an air compressor including a vacuum-side inlet and a pressure-side outlet; (c) a power means adapted to supply power to the air compressor; (d) a recirculation circuit in fluid communication with the vacuum-side inlet and the pressure-side outlet of the air compressor, the recirculation circuit comprising: (i) an inlet-vacuum portion connected to the vacuum-side inlet of the air compressor; (ii) an outlet-pressure portion connected to the pressure-side outlet of the air compressor, the outlet-pressure portion including an internal positive pressure opening in fluid communication with the pressure-side outlet of the air compressor; and (iii) a bypass control valve adapted to control the amount of air passing from the outlet-pressure portion to the inlet-vacuum portion; (e) a first vacuum nozzle in fluid communication with the inlet-vacuum portion of the recirculation circuit; (f) a second vacuum nozzle in fluid communication with the inlet-vacuum portion of the recirculation circuit; (g) a conductivity indicator comprising two lead inputs and an indicator light, the conductivity indicator operable to visually indicate whether the pressure switch is open or closed; and (h) an electrical switch configured as an on/off button adapted to permit electrical communication between the battery and the air compressor.

The calibration/diagnostic apparatus of the present invention typically provides vacuum and air pressure by means of a small battery-powered air compressor located inside its housing. In one embodiment, the apparatus is typically associated with a free-standing pressure test means and conductivity indicator, with the pressure test means and the conductivity indicator removably attachable to the apparatus. In another embodiment, both the pressure test means and conductivity indicator are incorporated within the housing of the apparatus. In yet another embodiment, just the conductivity indicator is incorporated within the housing of the apparatus. A pressure test means generally includes an air pressure measuring device and a connecting means. The air pressure measuring device (for example, a manometer or a Magnehelic gage) is typically used to measure the pressure being transmitted from the apparatus to the pressure switch. A conductivity indicator is generally an electrical measuring device used to test whether an adjustable pressure switch is open or closed.

The nature and advantages of the present invention will be more fully appreciated from the following drawings and detailed description.

BRIEF DESCRIPTION OF THE DRAWINGS

The accompanying drawings illustrate embodiments of the invention and, together with a general description of the invention given above, and the detailed description given below, serve to explain the principles of the invention.

DETAILED DESCRIPTION OF THE INVENTION

The present invention is a calibration and diagnostic apparatus for use with pressure switches that are typically used in HVAC systems and residential and commercial furnaces. In the following Figures, positive and negative symbols are used for both pressure and electricity. Thus, for clarity sake, positive and negative pressure outlets will be indicated with [+] and [−], respectively, while positive and negative electrical poles will be indicated with (+) and (−), respectively, in the Figures.

Figure 1:
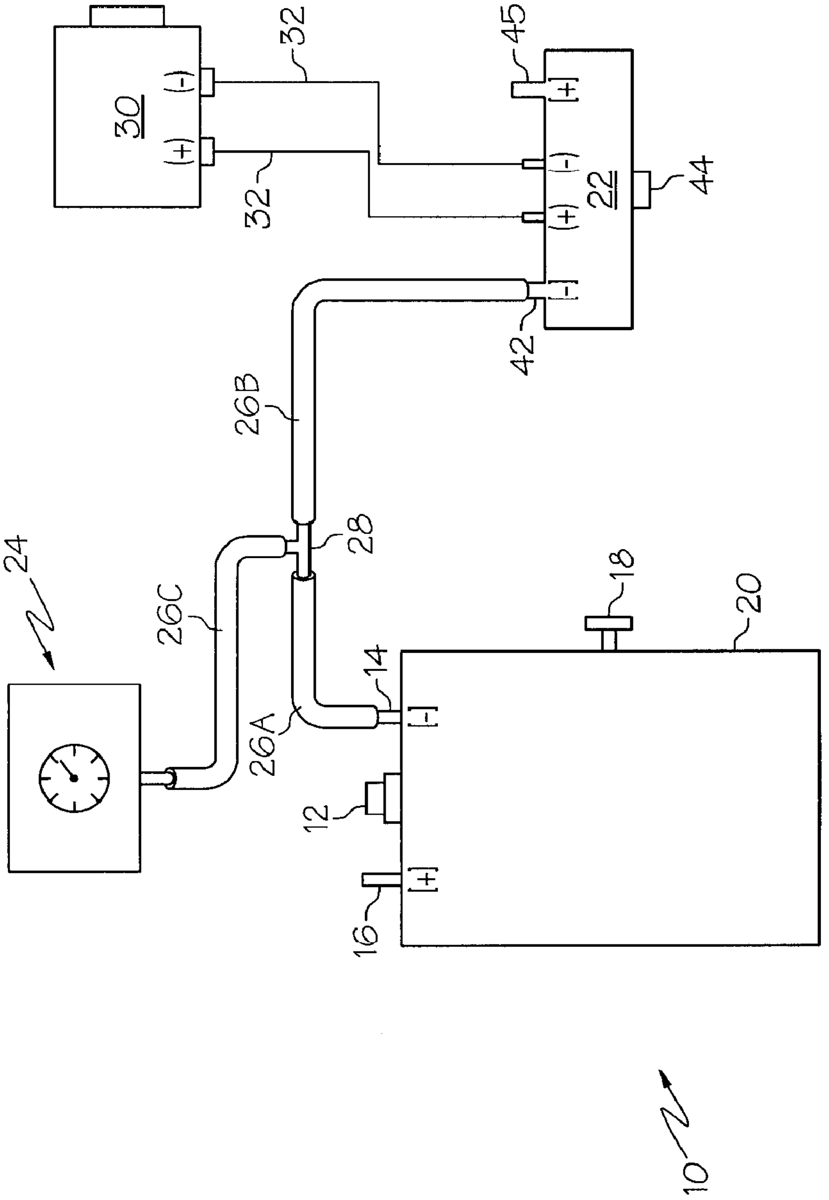
FIG. 1 is a schematic view of one embodiment of a portable calibration device according to the present invention, connected to a pressure switch.

With reference to FIG. 1, one embodiment of the pressure switch calibration and diagnostic device 10 of the present invention is illustrated, and includes an on/off switch or button 12, a vacuum nozzle 14, a pressure nozzle 16, and a pressure bypass control means or control valve 18. The on/off button 12, nozzles 14, 16 and knob of the control valve 18 are mounted on the external surface of the housing 20 of the device 10. The apparatus 10 is removably connectable into fluid communication with an adjustable pressure switch 22 and a pressure measuring device 24 by way of flexible hose 26A-C and a three-way T-piece 28. The pressure switch 22 is connected to a conductivity indicator 30 by electrical test leads 32. The pressure switch 22 includes a vacuum-side port 42, a set screw 44 and a pressure-side port 45. After assembling the circuitry as illustrated in FIG. 1, a user can adjust the set screw 44 on the adjustable pressure switch 22 to be calibrated to "full open" so that there is little or no differential between the vacuum port 42 and the pressure port 45, and to completely open the switch 22 to the calibration and diagnostic apparatus 10.

Together, the flexible hose 26A-C and T-piece 28 constitute a connecting means. In the present invention, connecting means generally include connective tubing such as flexible hose and one or more T-pieces and/or valves, and is operable to bring an air pressure measuring device and an adjustable pressure switch into communication with either the vacuum inlet nozzle 14 or the pressure outlet nozzle 16, thereby transmitting either a vacuum or air pressure to both the pressure switch and the air pressure measuring device.

Figure 2:
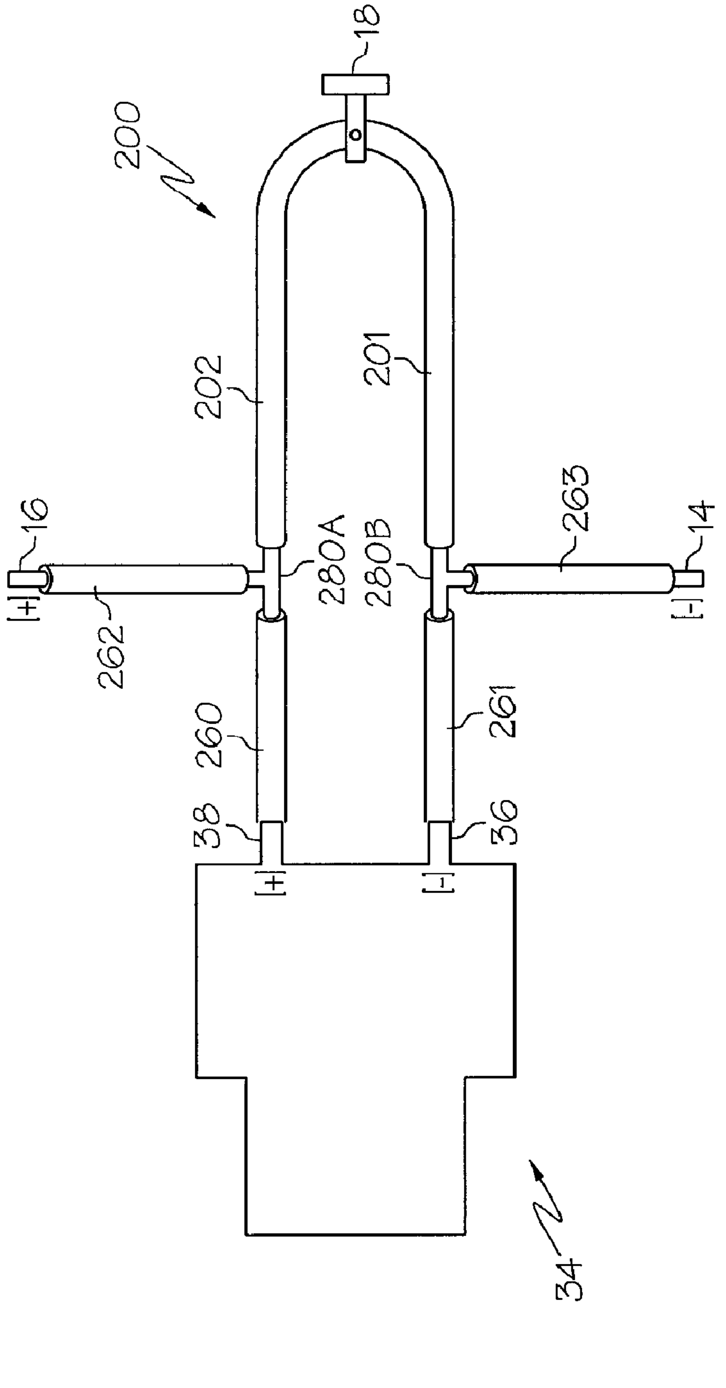
FIG. 2 is a schematic view of the interior air pressure circuitry of the portable calibration device of FIG. 1.
Figure 3:
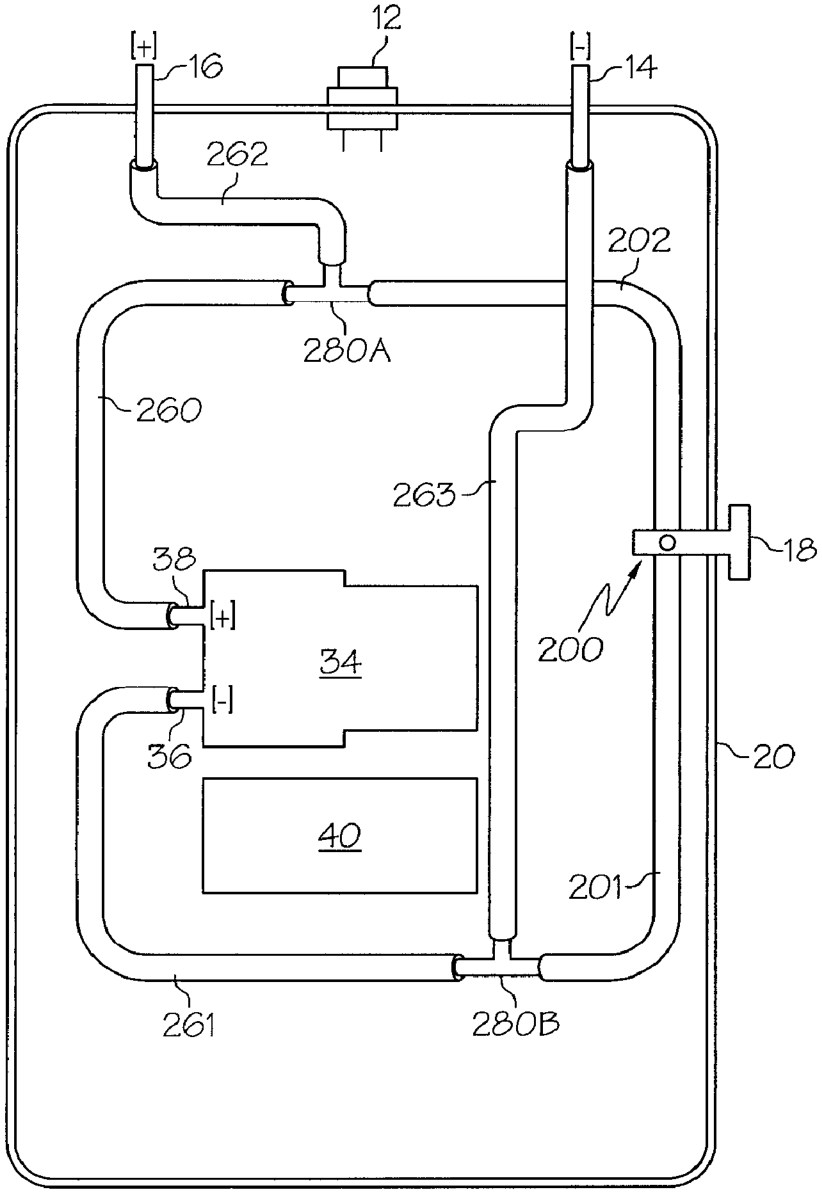
FIG. 3 is a plan view of the interior air pressure circuitry of the portable calibration device of FIG. 1.

FIGS. 2 and 3 illustrate a schematic and plan view, respectively, of the internal air pressure circuitry of device of FIG. 1. Specifically, FIG. 2 shows an air compressor 34 having a vacuum inlet 36 and a pressure outlet 38 connected in fluid communication by flexible tubing 260, 261, 262, 263 and T-pieces 290A and 290B to the vacuum nozzle 14 and the pressure nozzle 16. Further, a recirculation circuit 200 is created by flexible tubing 201, 202 running from T-pieces 280A and 280B to the bypass control valve 18. The bypass control valve 18 is typically comprised of an internally placed needle valve with an external control knob, and is capable of fine regulation of airflow. FIG. 3 illustrates the air circuitry of FIG. 2 when assembled within the housing 20 of the apparatus.

The air compressor 34 is typically a positive displacement air pump, and, for example, a 6 volt vacuum pump such as one made by Koge Electronics Co., LTD works well for this purpose. The air compressor 34 typically creates pressures in the range of between about minus 0.05 to about positive 25.0 inches of water. Connecting means or connective tubing used with the present invention is typically either 3 mm (5/32 inches) internal diameter tubing or 1/4 inch internal diameter tubing, and bulkhead nozzles used herein are typically 1/4 inch internal diameter. However, these are merely typical examples used in the apparatus and are not intended to limit the present invention in any way. More powerful air compressors capable of generating larger air pressures, and larger bore tubing and nozzles will work equally well with the configuration disclosed herein.

Viewing either FIG. 2 or FIG. 3, when the air compressor 34 is in the "on" position gas or air is drawn into the vacuum-side inlet 36, which reduces the air pressure on the vacuum-side connecting means 261. In a closed system, a vacuum is created. The reduced pressure at the vacuum inlet 36 is communicated via the connecting means 261 and 263 and T-piece 280B to the vacuum nozzle 14, to pull or draw air into the nozzle 14. Likewise, positive pressure is created by the compressor 34 as gas or air is pumped out of the pressure outlet 38, and is communicated to the pressure nozzle 16 via connecting means 260 and 262 and T-piece 280A to expel air out of the nozzle 16.

The actual gas pressures at the nozzles 14, 16 are regulated by increasing or decreasing the amount of air being circulated through the recirculation circuit 200. The bypass control valve 18 performs this function. When the bypass control valve 18 is closed, the recirculation circuit 200 is closed and there is no connection between the pressure circuitry and the vacuum circuitry. This enables the compressor 34 to achieve maximum vacuum and pressure exerted at the nozzles 14, 16. When the bypass control valve 18 is opened, then the flow of gas from the pressure-side outlet 38 of the air compressor 34 can be recirculated back to the vacuum-side inlet 36 through the recirculation circuit 200 via the flexible tubing 201 and 202 and T-pieces 280A and 280B, leading to and away from the valve 18. Increased air recirculation decreases the vacuum and air pressures at nozzles 14 and 16, respectively. Thus, vacuum and air pressure at the nozzles 14, 16 are regulated simultaneously by means of the bypass control valve 18. Adjusting this valve 18 permits the user to both test and calibrate pressure switches, as will be explained in more detail below.

Figure 4:
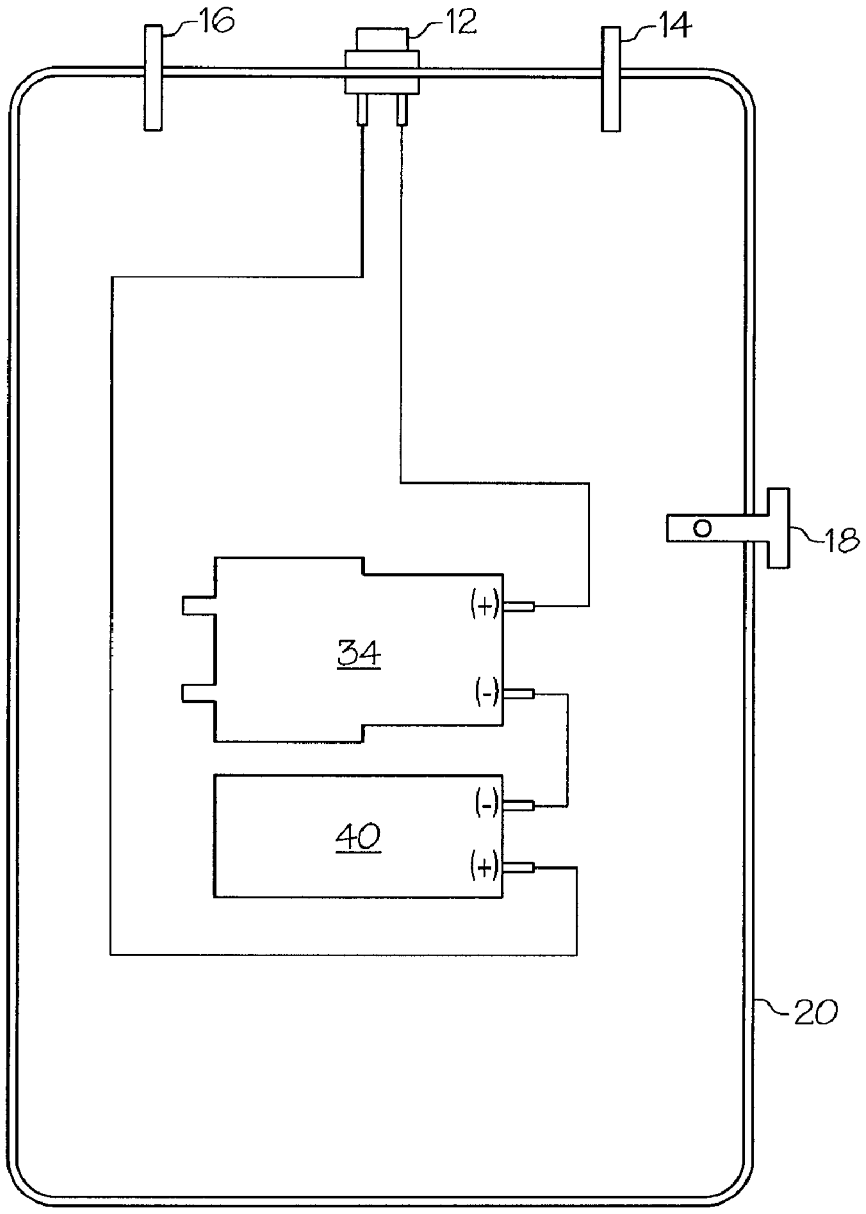
FIG. 4 is a plan view of the interior electrical circuitry of the portable calibration device of FIG. 1.

FIG. 4 is a schematic view of the interior electrical circuitry of the apparatus 10. The apparatus typically includes a battery 40 which provides electrical power to the air compressor 34. As illustrated, the positive pole (+) of the battery 40 is connected to one pole of the on/off button 12, and the negative pole (−) of the battery 40 is connected to the negative pole (−) of the air compressor 34. The positive pole (+) of the air compressor 34 is connected to another pole of the on/off button 12, such that when the on/off button is in the "on" position, the circuit is completed and the air compressor is operating. Turning the on/off button to the "off" position will break the circuit and the air compressor 34 will turn off. For simplicity sake, the air pressure circuitry of FIGS. 2 and 3 is shown separately from the electrical circuitry of FIG. 4; however, both of these circuitries are to be housed together within housing 20 of the apparatus 10.

As seen best in FIG. 1, the apparatus 10 of the present invention is typically used in conjunction with an air pressure measuring device 24 and a conductivity indicator 30 to provide a constant positive pressure or a constant vacuum in order to adjust or test a pressure switch 22. Typically, the air pressure measuring device 24 is a device that can measure absolute pressure, typically in pressure units of "inches of water." For example, a "Magnehelic" gage such as one manufactured by Dwyer, a differential pressure manometer, digital manometer, or equivalent pressure gage have all been found particularly suitable as an air pressure measuring device 24. The conductivity indicator 30 is used to measure electrical resistance in ohms across the actuation switch of the pressure switch 22. A lack of electrical current across this switch indicates that there is not enough vacuum or air flow to complete the electrical circuit within the pressure switch or that the pressure switch has failed.

As described above, the air compressor 34 within the device 10 provides the pressure and/or vacuum production for the apparatus, and the bypass control valve 18 regulates the amount or value of the pressure and the vacuum production. In the configuration shown in FIG. 1, the vacuum nozzle 14 is connected into fluid communication with a vacuum port 42 of the pressure switch 22. The bypass control valve 18 prevents undue stress on the air compressor by controlling the amount of air recirculating through the recirculation circuit, and controls the amount of air to be pulled in from the vacuum port 42. Flexible tubing 26A-C connects the vacuum nozzle 14 to the vacuum port 42 and the port for the pressure measuring device 24, with T-piece 28 allowing this three-way connection.

In use, the apparatus 10 can be used for calibrating an adjustable pressure switch 22. For purposes of illustration, the apparatus is used to calibrate an adjustable pressure switch 22 which operates in a "normally open" manner. This means that until a sufficient vacuum is measured across the pressure switch 22, the electrical circuit is open and no electrical signal is generated. The adjustable pressure switch 22 has a set screw 44 which is used to activate or deactivate an electrical circuit when the target pressure differential across the pressure-side port 45 and the vacuum-side port 42 is achieved. After assembling the circuitry, as illustrated in FIG. 1, the user adjusts the set screw 44 on the adjustable pressure switch 22 to be calibrated to "full open" so that there is little or no differential between the vacuum port 42 and the pressure port 45, and to completely open the switch 22 to the calibration apparatus 10. The bypass control valve 18 is also turned to "full open." With the bypass control valve fully open, the pressure differential generated across the nozzles 14, 16 of the calibration apparatus 10 will be minimal when the air compressor 34 is operating. The calibration apparatus 10 is then turned "on" to operate the air compressor 34, and the pressure bypass control valve 18 is then slowly adjusted (i.e. closed) until the pressure reading on the manometer 24 matches the manufacturer's specified pressure (or vacuum) for the pressure switch 22. The user then slowly adjusts the set screw 44 on the adjustable pressure switch 22 until the conductivity indicator 30 confirms that electricity is flowing across the switch 22 and it has closed. At this point the pressure switch 22 is calibrated and thus set to close its actuation switch at the exact pressure specified by the manufacturer. When the switch 22 is connected to the HVAC system, it will close when the pressure in the HVAC system drops below the preset pressure value.

The apparatus of the present invention can also be used as a diagnostic tool for early detection of pressure switch failure. That is, the apparatus can also be used to hold a specific pressure differential on any pressure switch, adjustable or not, thereby enabling diagnostic testing of the pressure switch. For example, to diagnose a pressure switch failure for a "vacuum," "normally open" pressure switch similar to the previous example above, the device 10 is first attached to the pressure switch 22 as explained above. Once the proper air pressure (or vacuum) is attained and the test leads of the conductivity indicator 30 are attached, the user slowly adjusts the pressure bypass control valve 18 to increase the amount of pressure transmission to the pressure switch from the nozzle 14 until the pressure switch closes (as confirmed by the attached conductivity indicator 30). If this closing pressure is not within the manufacturer's recommended specifications, then the switch should be adjusted, and, if it is not adjustable, should be considered unsafe and should be replaced, regardless of whether the furnace is presently operating properly or not.

To test a dual pressure switch, a user performs the steps performed on the vacuum-side port 42 of the switch, as explained above, to the positive-side port 45 of the dual pressure switch as well. First, the user measures the amount of pressure that is being generated at the pressure-side port 45. To do this, it is first necessary to turn the furnace off and disconnect the furnace from the vacuum-side port 42 of the pressure switch, then connect a hose to the pressure-side port 45. Thereafter, connect a T-piece to the end of this hose. Connect the vacuum-side port 42 to the T-piece, and then connect another hose to the final side of the T-piece. At the other end of this hose connect the manometer. Turn the furnace on and record the value of the pressure indicated on the manometer. Next, turn the furnace off and disconnect the manometer, hoses and T-piece. Reconnect the furnace to the vacuum-side port 42, and connect the positive pressure nozzle 16 of the apparatus and a manometer via a T-piece to the pressure-side port 45 of the pressure switch, and turn the furnace on. Once the furnace flames are on, open the bypass control valve 18 of the apparatus to "full open." Turn the diagnostic apparatus 10 on by depressing the on/off button 12, and slowly adjust the bypass control valve 18 to increase the pressure. Note the pressure indicated on the manometer 24 when the furnace shuts down. Subtract this reading from the reading you took earlier. This sum is the actual operating pressure of the pressure switch. If this pressure is not within the manufacturer's recommended specifications, then the switch should be adjusted, and, if it is not adjustable, should be considered unsafe and should be replaced, regardless of whether the furnace is presently operating properly or not.

Pressure switches that have had water in them are notorious for being a "sticking switch." Water develops within pressure switches for a number of reasons. High efficiency furnaces operate at lower temperatures thus resulting in condensation. Older furnaces were often operated at much higher temperatures, thus not allowing any condensation to form. If there is a trap in the tubing (i.e. the line goes down then up) that connects the pressure switch to the furnace, the tubing may fill with water. This in turn will shut the furnace down, but water in the tubing may enter the pressure switch. Also, simply because the furnace is causing condensation, water may enter the pressure switch. Condensation contains contaminants which build up over time. If the pressure switch is made of metal it is further complicated because the water will cause rust to form on the pressure switch, which will cause the pressure switch to fail. If the pressure switch is sticking or is full of water, it should be replaced regardless of whether the furnace is presently operating properly or not. To test for a sticking pressure switch, adjust the pressure a little beyond the specified settings, using the diagnostic method explained above. The switch will be inconsistent with closing and opening if it is sticking. It also may be intermittent in operating meaning it may close then open properly one time out of about three to five trials.

By using the apparatus of the present invention one can also test for a ruptured diaphragm in the pressure switch, as the switch will close and then open shortly thereafter. This indicates that the diaphragm has moved and the switch closed because of the pressure, but if the pressure bleeds through the diaphragm, and the pressure remains constant, the diaphragm will move back and open the switch. To test this, once the correct pressure has been reached and the switch closes, wait 10 to 30 seconds. If the switch remains closed then the diaphragm located inside the switch is holding and is good. If the ohm meter light goes out the switch has opened (on a normally closed switch), then there is leakage in the diaphragm. This switch should be replaced regardless of whether the furnace is presently operating properly or not.

Figure 5:
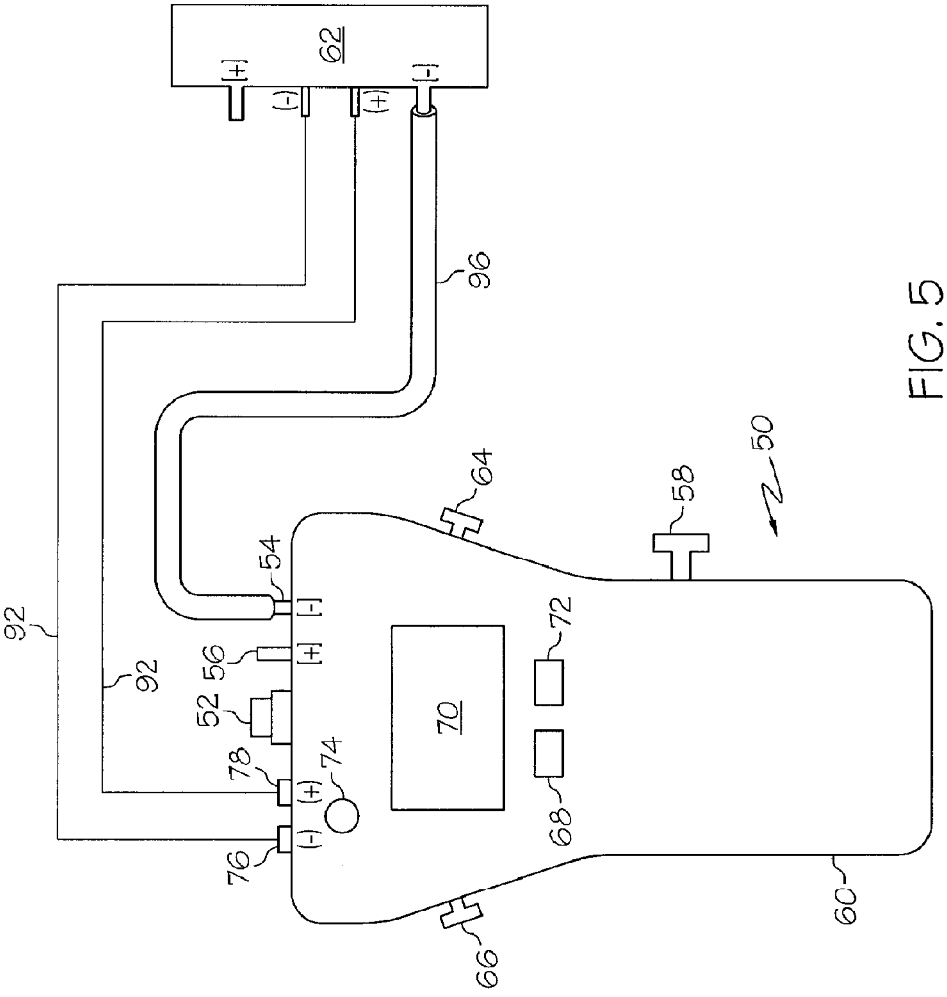
FIG. 5 is a schematic view of another embodiment of a portable calibration device according to the present invention, connected to a pressure switch.

FIG. 5 illustrates another embodiment of the present invention which incorporates a manometer and a conductivity indicator within the housing of the calibration and diagnostic device. Similar to the apparatus 10 in FIGS. 1-4, the apparatus 50 in FIG. 5 includes an on/off button 52, a vacuum nozzle 54, a pressure nozzle 56, and a pressure bypass control means such as bypass control valve 58. The external surface of the housing 60 of the apparatus 50 further includes a vacuum throttle valve 64, a pressure throttle valve 66, a manometer power switch 68, a manometer readout screen 70, a manometer zero button 72, a conductivity indicator light 74, and conductivity indicator lead inputs 76 and 78. As illustrated, the vacuum nozzle 54 can be removably connected to a pressure switch 62 by way of flexible hose 96, and the pressure switch 62 can also be connected to conductivity indicator leads 76 and 78 by electrical test leads 92. When this circuit is completed, the conductivity indicator light 74 illuminates.

Figure 6:
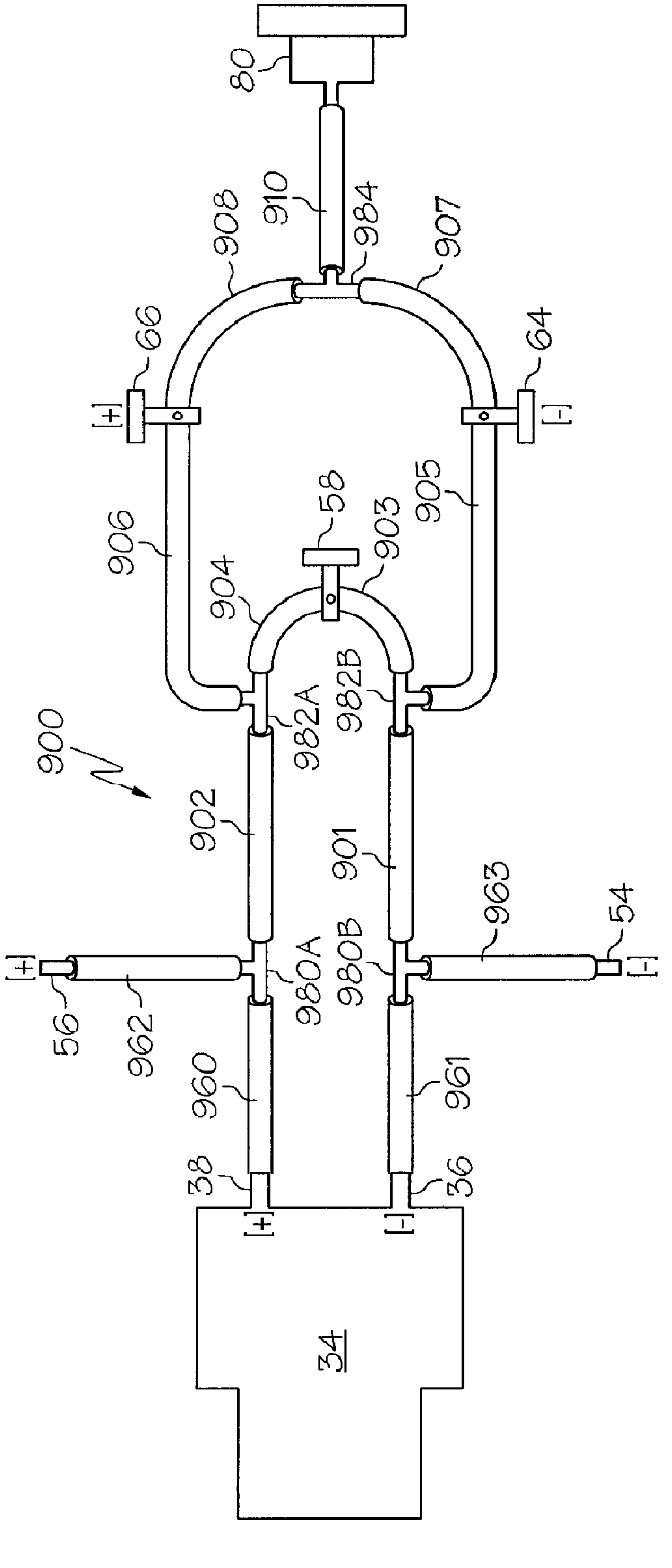
FIG. 6 is a schematic view of the interior air pressure circuitry of the portable calibration device of FIG. 5.
Figure 7:
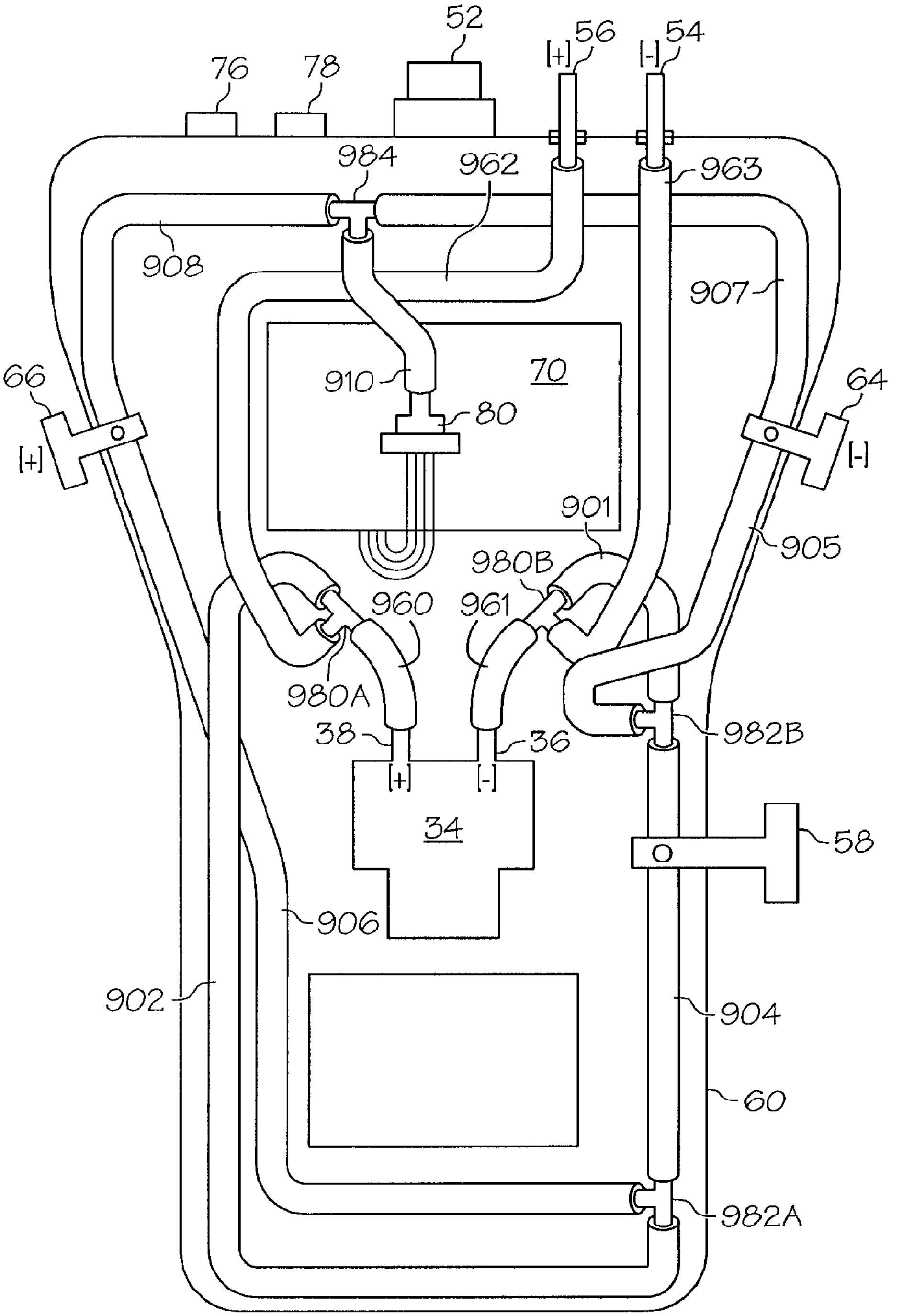
FIG. 7 is a plan view of the interior air pressure circuitry of the portable calibration device of FIG. 5.

FIGS. 6 and 7 illustrate a schematic and plan view, respectively, of the internal air pressure circuitry of the apparatus 50 of FIG. 5. Specifically, FIG. 6 shows a simplified schematic view of the circuitry in which the air compressor 34 including vacuum inlet 36 and pressure outlet 38 is connected by flexible tubing 960, 961, 962, 963 and T-pieces 980A and 980B to the vacuum nozzle 54 and the pressure nozzle 56. Further, a recirculation circuit 900 is created by flexible tubing 901, 902 running from T-pieces 980A, 980B to T-pieces 982A, 982B, which are connected to the bypass control valve 58 by flexible tubing 903, 904. As is best seen in FIG. 6, the recirculation circuit 900, including flexible tubing 901-904 and T-pieces 980A, 980B, 982A, 982B, is connected to a circuit for a pressure measuring device 80. This pressure measuring circuit connects with the T-piece connections 982A and 982B on either side of the bypass control valve 58. Additional flexible tubing 905, 906, 907 and 908 connect the vacuum throttle valve 64 and the pressure throttle valve 66 to the pressure measuring device 80 via T-piece 984 and flexible tubing 910, to complete the circuit for the pressure measuring device 80. The vacuum throttle valve 64 operates to throttle gas flow generated by the air compressor 34 from the manometer 80, and the pressure throttle valve 66 operates to throttle gas flow generated by the air compressor to the manometer 80.

FIG. 7 illustrates a plan view of the internal air pressure circuitry of the apparatus 50 when assembled within the housing 60 of the apparatus. The manometer 80 measures the pressure of the gas that is communicated through valves 64 and/or 66. In normal operation, typically only one of valves 64 or 66 is open at any one time, while the other is closed. In this manner, the manometer 80 is able to measure either vacuum or positive gage pressure. Having both valve 64 and valve 66 open at the same time may give a faulty reading, since the manometer will typically attempt to read both pressures at once. Conversely, having both valves 64, 66 closed will permit the manometer 80 to read only the pressure (vacuum and/or positive) of the gas isolated between the valves.

The pressures at the nozzles 54, 56 are regulated by increasing or decreasing the amount of air being re-circulated through the bypass control valve 58. When the bypass control valve 58 is fully closed, there is no recirculation of air and a maximum vacuum and/or positive pressure generated by the compressor 34 will typically be exerted at nozzles 54, 56. When the bypass control valve 58 is fully opened the flow of gas is able to recirculate in the direction from the pressure outlet 38 towards the vacuum inlet 36, thereby decreasing the vacuum and air pressure at the respective nozzles 54, 56. The circuitry connecting the manometer 80 to this system does not affect the balance between the bypass control valve 58 and the nozzles 54, 56. However, if both valves 64 and 66 are opened, the flow of pressure will also circulate through the manometer circuit, but this will only further decrease the pressures at the nozzles 54, 56. Thus, vacuum and air pressure at both nozzles 54, 56 is regulated simultaneously by means of the bypass control valve 58. Adjusting the bypass control valve 58 permits the user to both test and calibrate pressure switches, and opening either the vacuum throttle valve 64 or the pressure throttle valve 66 while the other is closed permits the user to measure either vacuum pressure or positive pressure, as will be explained in more detail below.

Figure 8:
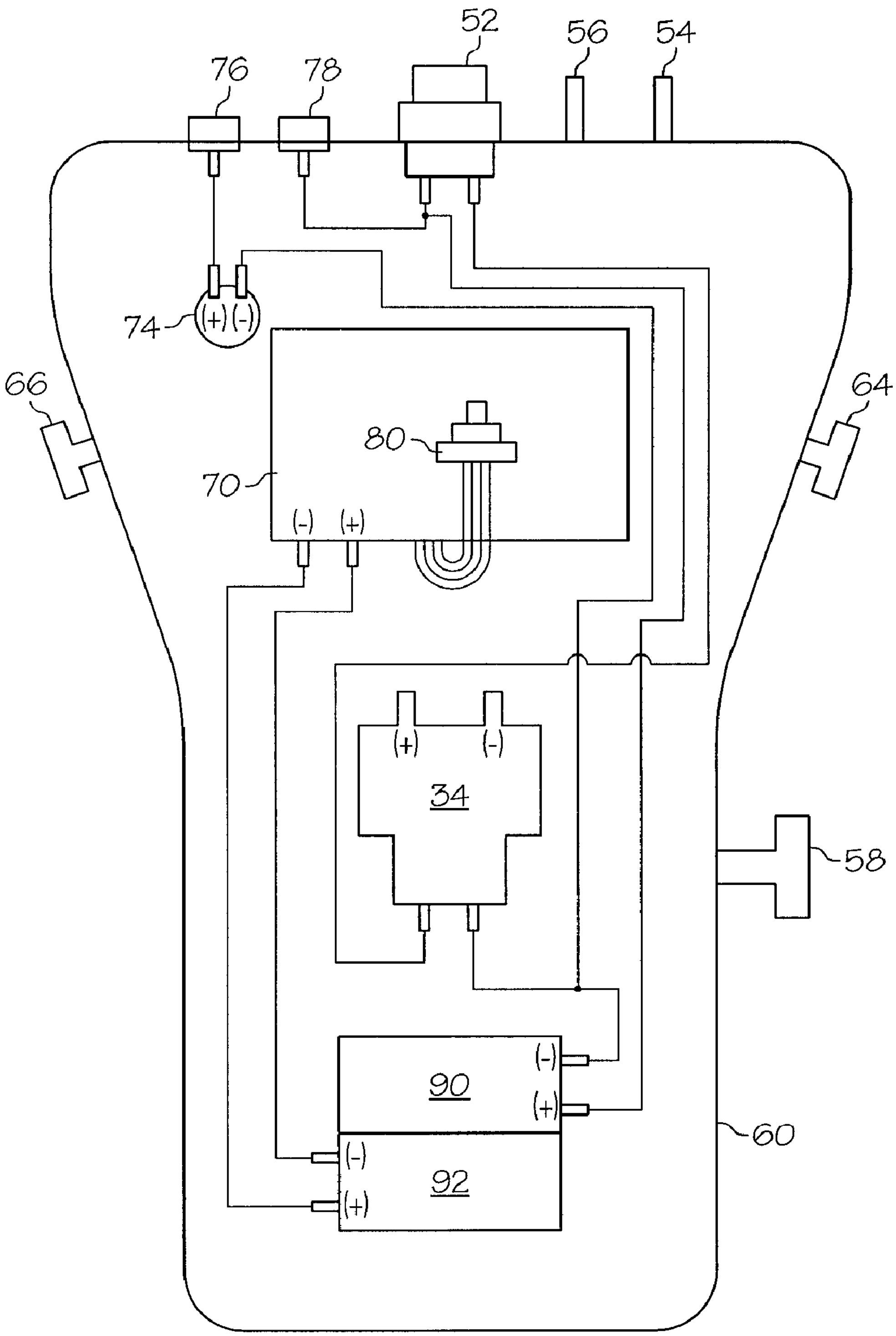
FIG. 8 is a plan view of the interior electrical circuitry of the portable calibration device of FIG. 5.

FIG. 8 is a perspective view of the interior electrical circuitry of the apparatus 50. This embodiment of the apparatus 50 includes an air compressor battery 90 and a manometer battery 92. Battery 90 powers the air compressor 34. As illustrated, the positive pole of battery 90 is connected to one pole of the on/off button 52, and the negative pole of battery 90 is connected to the negative pole of the air compressor 34. The positive pole of the air compressor 34 is connected to the other pole of the on/off button 52, such that when the on/off button is turned "on", the circuit is completed and the air compressor 34 is operating. Turning the on/off button 52 to the "off" position will break the circuit and the air compressor 34 will turn off. Further, one pole of the on/off button 52 is connected to conductivity indicator lead input 78.

Conductivity indicator lead input 76 is connected to the positive pole of the conductivity indicator light 74, and the negative pole of conductivity indicator is connected to the negative pole of the compressor battery 90 via the negative pole of the compressor 34. Thus, the conductivity indicator light 74 will be activated upon completion of the circuit between lead input 76 and lead input 78. Therefore, this apparatus can be used solely as a conductivity indicator, exclusive of its ability to test pressure switches. This is true as well for the pressure measuring device.

For example, if the pressure switch is a normally open switch, the conductivity indicator light will illuminate if the switch is working properly. Most pressure switches with two ports on them have a "common" terminal (in the power source) a "normally open" terminal (which closes once the pressure reaches the operating setting), and a "normally closed" terminal (which opens once the pressure reaches the setting). As best seen in FIG. 5, when the pressure switch 62 is connected to the conductivity indicator lead 76, 78 with electrical test leads 32, conductivity indicator light 74 will illuminate.

In FIG. 8, manometer battery 92 has its poles connected to the poles of the manometer 80, which exit from the manometer screen 70. In the embodiment shown, the compressor battery 90 is typically two size AA batteries and the manometer battery is typically a single 9 Volt battery. However, it is to be noted that batteries 90 and 92 are separate for simplicity and the apparatus is not limited to using two batteries; the manometer and the air compressor can be wired to run off of a single battery as well. For simplicity sake the air pressure circuitry of FIG. 7 is shown separately from the electrical circuitry of FIG. 8; however, both of these circuitries are to be housed together within the apparatus 50.

The apparatus 50 of FIGS. 5-8 is used in a similar manner as explained above for the apparatus 10 of FIGS. 1-4, however the pressure measuring device 80 and conductivity indicator are incorporated within the housing of the apparatus 50 (See FIG. 1, where the external pressure measuring device 24 and the conductivity indicator 30 are externally connectable to apparatus 10). This allows the user to conveniently calibrate and test the function of a pressure switch with a single apparatus, without having to carry a separate pressure measuring device and a separate conductivity indicator.

One embodiment of the apparatus of the present invention can include a "differential" manometer within the housing of the apparatus. This type of manometer has two ports (positive pressure and vacuum) instead of a single port. The positive port measures positive air pressure and the negative port measures vacuum air pressure. With a differential manometer having two ports connected within the circuitry, the valves 64 and 66, tubing 907, 908, 910, and T-piece 984 of the apparatus 50 as illustrated in FIGS. 6 and 7 would not be needed. The two ports (positive and vacuum) of the differential manometer would connect directly into T-pieces 982A and 982B, respectively. A differential manometer present within the housing of the apparatus of the present invention may simplify the ease of use of the apparatus for the service technician, but manufacturing may be more expensive. Yet another embodiment of the diagnostic and calibration apparatus can include a 3-way switch connecting the manometer (one port) to flexible tubing 905 and 906, thereby eliminating the need for valves 64, 66, T-piece 984, and tubing 907, 908 of FIGS. 6 and 7.

Figure 9:
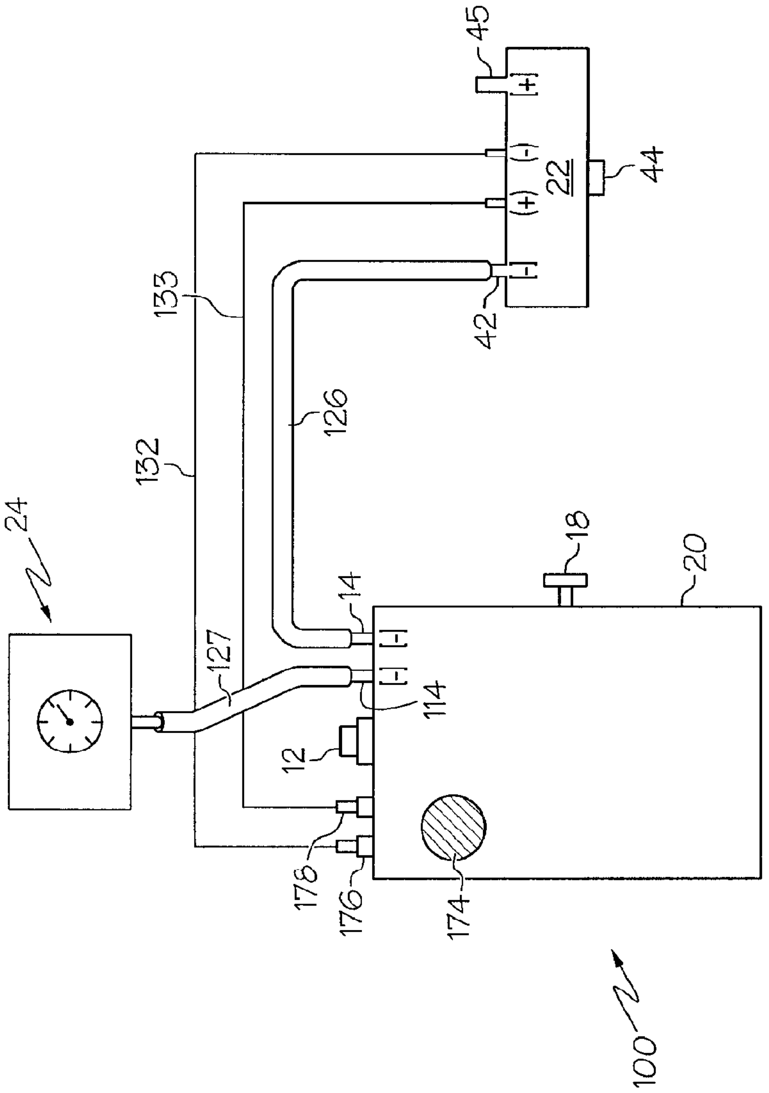
FIG. 9 is a schematic view of one embodiment of a portable calibration and test tool of the invention.

In FIGS. 9-12, like numbers are used to indicate like parts as shown in the embodiment illustrated in FIGS. 1-4. With reference now to FIG. 9, an alternative embodiment 100 of the pressure switch calibration and diagnostic device of the present invention is illustrated, which incorporates the conductivity indicator (30, in FIG. 1) within the housing of the unit, and thus provides the service technician the ability to test pressure switches without having to use an external conductivity indicator.

Similar to the apparatus 10 in FIGS. 1-4, the apparatus 100 in FIG. 9 includes an on/off button 12, a first vacuum nozzle 14, and a bypass control valve 18. As noted above, the bypass control valve 18 is typically comprised of needle valve with an external control knob, and is capable of fine regulation of airflow. The external surface of the housing 20 of the apparatus 100 further includes a second vacuum nozzle 114, a conductivity indicator light 174, and conductivity indicator lead inputs 176 and 178. As illustrated, the first vacuum nozzle 14 can be removably connected to the pressure switch 22 by way of flexible hose 126. The pressure switch 22 is also connected to conductivity indicator leads 176 and 178 by electrical test leads 132 and 133. When this circuit is completed, the conductivity indicator light 174 illuminates. As illustrated, either vacuum nozzle 14 or 114 of the apparatus 100 is removably connectable to an external pressure measuring device 24 by way of flexible hose 127. Since this embodiment includes two vacuum nozzles 14, 114, there is no requirement for a three-way T-piece (28, in FIG. 1) to be used externally from the apparatus, as is required in the embodiment shown in FIGS. 1-4, to connect the apparatus 100 to the pressure measuring device 24 and the pressure switch 22.

Figure 10:
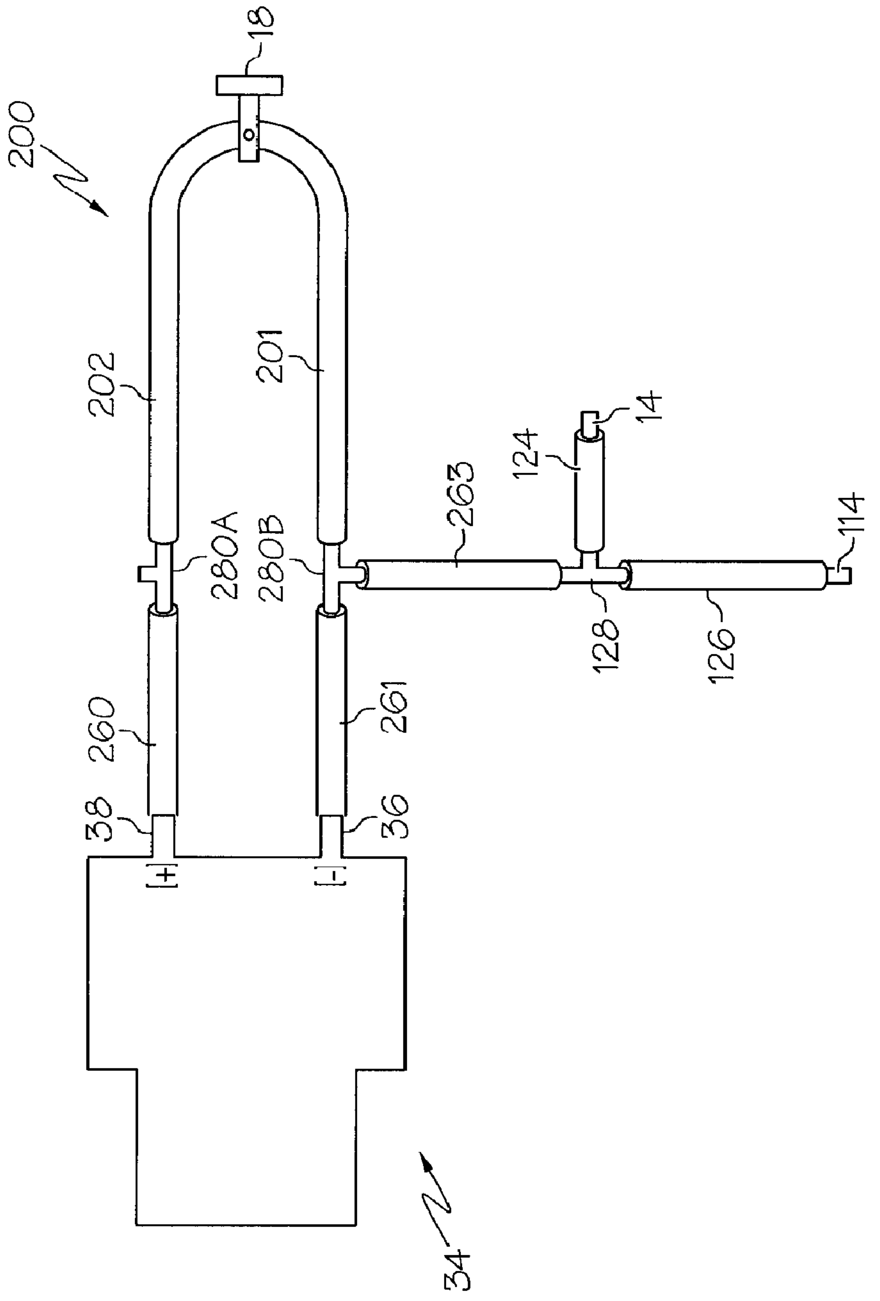
FIG. 10 is a schematic view of the interior air pressure circuitry of the tool of FIG. 9.
Figure 11:
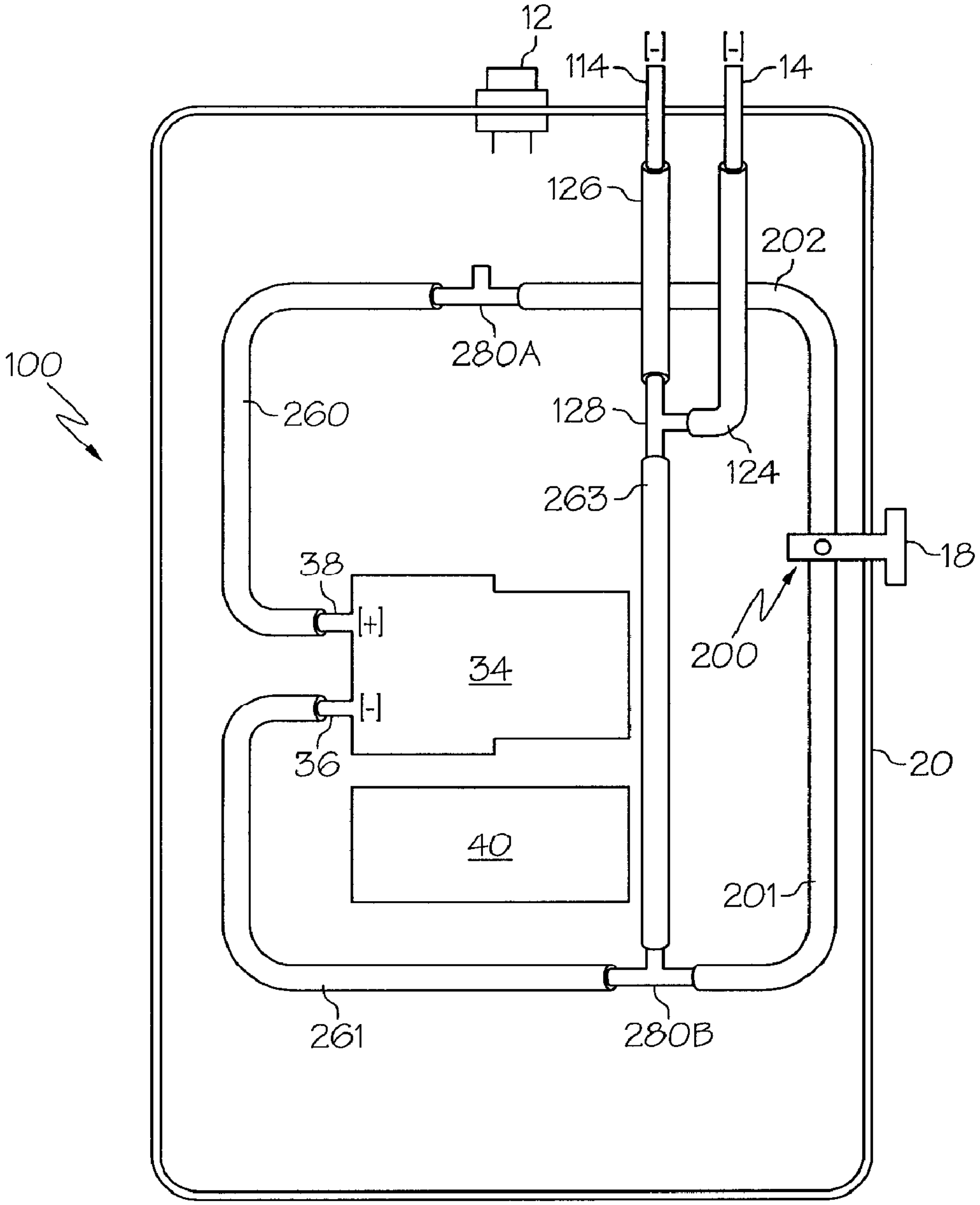
FIG. 11 is a plan view of the interior air pressure circuitry of the tool of FIG. 9.

FIGS. 10 and 11 illustrate a schematic and plan view, respectively, of the internal air pressure circuitry of device of FIG. 9. Specifically, FIG. 10 shows the air compressor 34 with a vacuum inlet 36 and a pressure outlet 38 connected in fluid communication by flexible tubing 260, 261, 263, 124 and 126, and T-pieces 280A and 128 to the first vacuum nozzle 14 and the second vacuum nozzle 114. Similarly to the embodiment of the apparatus shown FIG. 2, a recirculation circuit 200 is created by flexible tubing 201, 202 running from T-pieces 280A and 280B to the bypass control valve 18. However, in this alternative embodiment shown in FIG. 10, there is no pressure nozzle connecting the inside of the apparatus to the outside, such that positive pressure flows freely from the unused internal positive pressure opening of T-piece 280A into the inside of the apparatus. Also, T-piece 128 serves to divide the vacuum pressure generated by the compressor 34 into two parts, leading via flexible tubing 124 and 126 to the first vacuum nozzle 14 and the second vacuum nozzle 114, respectively.

FIG. 11 illustrates the air circuitry of FIG. 10 when assembled within the housing 20 of the apparatus. Viewing either FIG. 10 or FIG. 11, when the air compressor 34 is in the "on" position, gas or air is drawn into the vacuum-side inlet 36, which reduces the air pressure on the vacuum-side connecting means 261. In a closed system, a vacuum is created. The reduced pressure at the vacuum inlet 36 is communicated via the connecting means 261 and 263 and T-piece 280B to the first and second vacuum nozzles 14, 114, to pull or draw air into the nozzles. Likewise, positive pressure is created by the compressor 34 as gas or air is pumped out of the pressure outlet 38, and is communicated to the unused opening of the T-piece 280A, i.e. an internal positive pressure opening, to expel compressed air harmlessly within the inside of the housing 20.

The negative pressures at the nozzles 14, 114 are regulated by increasing or decreasing the amount of air being circulated through the recirculation circuit 200. The bypass control valve 18 performs this function. When the bypass control valve 18 is closed, the recirculation circuit 200 is closed and there is no connection between the pressure circuitry and the vacuum circuitry. This enables the compressor 34 to achieve maximum vacuum and pressure exerted at the nozzles 14, 114. When the bypass control valve 18 is opened, then a portion of the flow of gas from the pressure-side outlet 38 of the air compressor 34 can be recirculated back to the vacuum-side inlet 36 through the recirculation circuit 200 via the flexible tubing 201 and 202 and T-pieces 280A and 280B, leading to and away from the valve 18. Increased air recirculation decreases the vacuum pressures at nozzles 14 and 114. Thus, the mass air flow of air entering the first and second vacuum nozzles 14, 114, and the mass air flow of air exiting the T-piece 280A, is regulated by means of the bypass control valve 18. Adjusting this valve 18 permits the user to control the vacuum pressure at the first and second vacuum nozzles 14, 114, and to both test and calibrate pressure switches as described above, without the need for using an external T-piece (28, in FIG. 1) to direct the vacuum pressure to both the manometer and the pressure switch. Rather, the internal T-piece 128 performs this task, and is included within the housing 20 of the apparatus 100.

Figure 12:
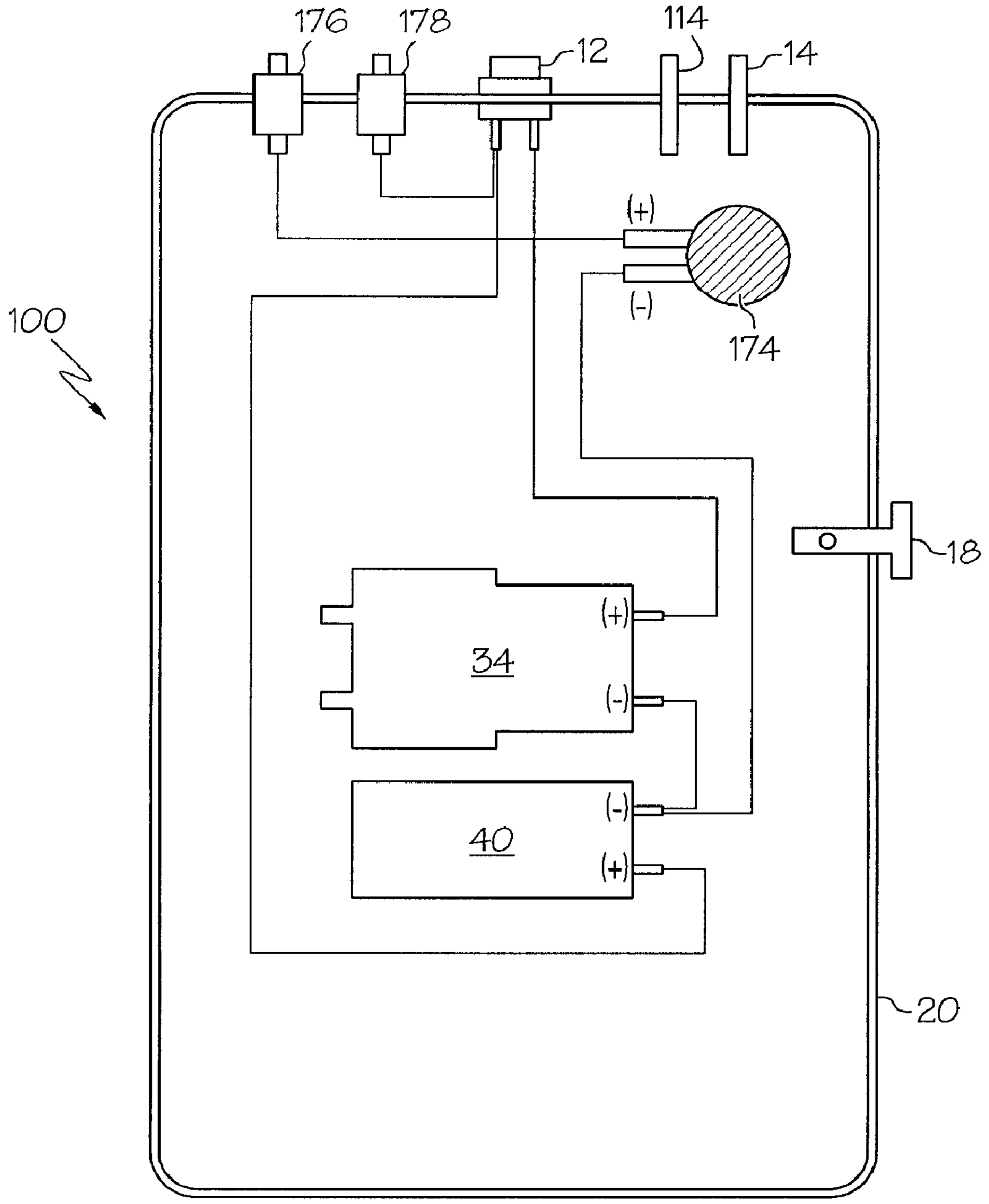
FIG. 12 is a plan view of the interior electrical circuitry of the tool of FIG. 9.

FIG. 12 is a schematic view of the interior electrical circuitry of the apparatus 100. Similarly to FIG. 4, the apparatus 100 of FIG. 12 includes a battery 40 which provides electrical power to the air compressor 34. The positive pole (+) of the battery 40 is connected to one pole of the on/off button 12, and the negative pole (−) of the battery 40 is connected to both the negative pole (−) of the air compressor 34 and the negative pole (−) of the conductivity indicator 174. The positive pole (+) of the air compressor 34 is connected to another pole of the on/off button 12, such that when the on/off button is placed in the "on" position, the circuit is completed and the air compressor is operated. Turning the on/off button to the "off" position will break the circuit and the air compressor 34 will turn off. For simplicity sake, the air pressure circuitry of FIGS. 10 and 11 is shown separately from the electrical circuitry of FIG. 12; however, both of these circuitries arc to be housed together within housing 20 of the apparatus 100.

As seen best in FIG. 9, the apparatus 100 is typically used in conjunction with an air pressure measuring device 24 such as a manometer. However the conductivity indicator 174 of FIG. 9 (30, in FIG. 1) is now internal to the housing 20 of the apparatus 100 (and not external, as in the apparatus 10 of FIG. 1). Similarly to the conductivity indicator 30 of FIG. 1, the conductivity indicator 174 of FIGS. 9 and 12 is used to measure electrical resistance in ohms across the actuation switch of the pressure switch. A lack of electrical current across this switch indicates that there is not enough vacuum or air flow to complete the electrical circuit within the pressure switch, or that the pressure switch has failed.

The air compressor 34 within the apparatus 100 of FIGS. 9 and 12 provides the vacuum production for the apparatus via nozzles 14 and 114, and the bypass control valve 18, typically a needle valve capable of fine regulation of airflow, regulates the amount of air that can be drawn through the nozzles 14 and 114, and thus the pressure value of the vacuum. In the configuration shown in FIG. 9, the vacuum nozzles 14, 114 are connected into fluid communication with a vacuum port 42 of the pressure switch 22 and the manometer 24, respectively. The bypass control valve 18 prevents undue stress on the air compressor by controlling the amount of air recirculating through the recirculation circuit, and controls the amount of air to be pulled in from the vacuum port 42

The portable calibration device of the present invention is typically able to diagnose problems with any manufacturer's HVAC pressure switch, and will also be able to calibrate any adjustable pressure switch. Adjustable pressure switches typically include both a pressure port and a vacuum port and can be used in place of the manufacturer's pressure switch, should a service technician not have an exact replacement switch at the worksite.

The various embodiments of the portable calibration device disclosed herein are typically intended to be light in weight and small enough to fit in one hand of the technician, to be carried from one work site to the next in a pocket or small carrying bag. In one embodiment, the apparatus is designed to be used in conjunction with a free standing pressure measuring device such as a differential pressure manometer or equivalent pressure gage, and a conductivity indicator such as an ohm meter, a multimeter (an instrument that combines the functions of an ammeter, a voltmeter and an ohm meter) or an electrical continuity tester. In another embodiment, the apparatus includes the pressure measuring device and the continuity meter within its housing.

Early detection of pressure switch failure while the pressure switch is incorporated into an HVAC system has previously not been possible. The various embodiments of the apparatus of the present invention can potentially decrease the number of return visits currently made by HVAC service technicians, reduce overtime costs, and will likely prevent property damage caused by incorrect pressure switch settings and/or previously unrecognized pressure switch failure. The pocket sized apparatus is conveniently held in one hand when being used, making it extremely suitable for HVAC service technicians. A technician will no longer have to carry large calibrating devices to the worksite, or alternatively be resigned to replacing a properly functioning pressure switch because proper testing equipment is not available.

While the present invention has been illustrated by the description of embodiments thereof, and while the embodiments have been described in considerable detail, it is not intended to restrict or in any way limit the scope of the appended claims to such detail. Additional advantages and modifications will be readily apparent to those skilled in the art. Accordingly, departures may be made from such details without departing from the scope or spirit of the invention

What is claimed is:

1. An apparatus for calibrating and testing a pressure switch, the apparatus comprising:

a. a housing including an inside and an external surface;

b. an air compressor located on the inside of the housing, the air compressor including a vacuum-side inlet and a pressure-side outlet;

c. a first vacuum nozzle located within the external surface of the housing, the first vacuum nozzle being in fluid communication with the vacuum-side inlet of the air compressor;

d. a second vacuum nozzle located within the external surface of the housing, the second vacuum nozzle being in fluid communication with the vacuum-side inlet of the air compressor;

e. an internal positive pressure opening in fluid communication with the pressure-side outlet of the air compressor, wherein the internal positive pressure opening is located inside the housing of the apparatus;

f. a recirculation circuit located on the inside of the housing, the recirculation circuit being in fluid communication with the vacuum-side inlet, the pressure-side outlet, the first and second vacuum nozzles and the internal positive pressure opening;

g. a bypass control valve comprising a needle valve located within the recirculation circuit and a control knob located within the external surface of the housing, wherein the bypass control valve is capable of fine regulation of airflow for controlling the amount of air passing from the pressure-side outlet to the vacuum-side inlet of the air compressor;

h. a conductivity indicator comprising two lead inputs located on the inside of the housing and an indicator light located within the external surface of the housing, the conductivity indicator operable to visually indicate whether the pressure switch is open or closed;

i. a battery in electrical communication with the air compressor and the conductivity indicator, the battery located on the inside of the housing and adapted to supply power to the air compressor; and j. an electrical switch located within the external surface of the housing and configured as an on/off button adapted to permit electrical communication between the battery and the air compressor.

2. The apparatus of claim 1, further comprising an air pressure measuring device located on the inside of the housing, the air pressure measuring device operable to measure air within the recirculation circuit.

3. The apparatus of claim 2, wherein the air pressure measuring device is selected from the group consisting of a manometer, a Magnehelic gage, a differential pressure manometer, and a digital manometer.

4. The apparatus of claim 1, wherein the air compressor, the battery, the internal positive pressure opening, the lead inputs of the conductivity indicator and the recirculation circuit are located within the inside of the housing, and wherein the first and second vacuum nozzles, the control knob of the bypass control valve, the electrical switch and the indicator light of the conductivity indicator are located within the external surface of the housing.

5. The apparatus of claim 1, wherein the inside of the housing includes a battery compartment and a compressor compartment, the battery being removably mountable within the battery compartment, and the air compressor being removably mountable within the compressor compartment.

6. The apparatus of claim 1, wherein the battery is selected from the group consisting of a single 9 Volt battery and two size AA batteries.

7. An apparatus for the calibration and testing of a pressure switch, the apparatus comprising:

a. a housing including an inside and an external surface;

b. an air compressor having a vacuum-side inlet and a pressure-side outlet wherein the air compressor is powered by a battery in electrical communication therewith;

c. a first vacuum nozzle in fluid communication with the vacuum-side inlet of the air compressor;

d. a second vacuum nozzle in fluid communication with the vacuum-side inlet of the air compressor;

e. an internal positive pressure opening in fluid communication with the pressure-side outlet of the air compressor;

f. a recirculation circuit in fluid communication with the vacuum-side inlet, the pressure-side outlet, the first and second vacuum nozzles and the internal positive pressure opening;

g. a bypass control valve within the recirculation circuit comprising a needle valve and a control knob, wherein the bypass control valve is capable of fine regulation of airflow for controlling the amount of air passing from the pressure-side outlet to the vacuum-side inlet of the air compressor; and h. a conductivity indicator including at least two lead inputs and an indicator light, the conductivity indicator operable to visually indicate whether the pressure switch is open or closed, wherein the air compressor, the battery, the internal positive pressure opening, the recirculation circuit, and the lead inputs of the conductivity indicator arc located on the inside of the housing, and wherein the first and second vacuum nozzles, the control knob of the bypass control valve and the indicator light of the conductivity indicator are located within the external surface of the housing.

8. The apparatus of claim 7, further comprising an air pressure measuring device located on the inside of the housing, the air pressure measuring device operable to measure air within the recirculation circuit.

9. The apparatus of claim 8, wherein the air pressure measuring device is selected from the group consisting of a manometer, a Magnehelic gage, a differential pressure manometer, and a digital manometer.

10. The apparatus of claim 7, wherein the air compressor, the internal positive pressure opening, and the recirculation circuit are located within the inside of the housing, and wherein the first and second vacuum nozzles, the control knob of the bypass control valve and the indicator light of the conductivity indicator are located within the external surface of the housing.

11. The apparatus of claim 7, wherein the air compressor is powered by a battery in electrical communication therewith.

12. The apparatus of claim 7, further comprising an electrical switch configured as an on/off button located within the external surface of the housing and adapted to permit electrical communication between the battery and the air compressor.

13. The apparatus of claim 12, wherein the inside of the housing includes a battery compartment and a compressor compartment, the battery being removably mountable within the battery compartment, the air compressor being removably mountable within the compressor compartment.

14. The apparatus of claim 7, wherein the battery is selected from the group consisting of a single 9 Volt battery and two size AA batteries.

15. An apparatus for calibrating and testing a pressure switch, the apparatus comprising:

a. a housing including an inside and an external surface;

b. an air compressor including a vacuum-side inlet and a pressure-side outlet;

c. a battery adapted to supply power to the air compressor;

d. a recirculation circuit in fluid communication with the vacuum-side inlet and the pressure-side outlet of the air compressor, the recirculation circuit comprising:

i. an inlet-vacuum portion connected to the vacuum-side inlet of the air compressor;

ii. an outlet-pressure portion connected to the pressure-side outlet of the air compressor, the outlet-pressure portion including an internal positive pressure opening in fluid communication with the pressure-side outlet of the air compressor; and iii. a bypass control valve comprising a needle valve and a control knob, the bypass control valve adapted to control the amount of air passing from the outlet-pressure portion to the inlet-vacuum portion;

e. a first vacuum nozzle in fluid communication with the inlet-vacuum portion of the recirculation circuit;

f. a second vacuum nozzle in fluid communication with the inlet-vacuum portion of the recirculation circuit;

g. a conductivity indicator comprising two lead inputs and an indicator light, the conductivity indicator operable to visually indicate whether the pressure switch is open or closed; and h. an electrical switch configured as an on/off button adapted to permit electrical communication between the battery and the air compressor, wherein the air compressor, the battery, the lead inputs of the conductivity indicator, the internal positive pressure opening and the recirculation circuit are located within the inside of the housing, and wherein the first and second vacuum nozzles, the control knob of the bypass control valve, the electrical switch and the indicator light of the conductivity indicator are located within the external surface of the housing.

16. The apparatus of claim 15, wherein the battery is selected from the group consisting of a single 9 Volt battery and two size AA batteries.

17. The apparatus of claim 16, wherein the inside of the housing includes a battery compartment and a compressor compartment, the battery being removably mountable within the battery compartment, the air compressor being removably mountable within the compressor compartment.

18. The apparatus of claim 15, further comprising an air pressure measuring device located on the inside of the housing, the air pressure measuring device operable to measure air within the recirculation circuit.

19. The apparatus of claim 18, wherein the air pressure measuring device is selected from the group consisting of a manometer, a Magnehelic gage, a differential pressure manometer, and a digital manometer.

* * * * *